United States Patent [19]
Cline

[11] 3,855,852
[45] Dec. 24, 1974

[54] APPARATUS FOR CONTROLLING THE CHARACTERISTICS OF MAGNETICALLY OPERATED FRICTION TYPE POWER ABSORPTION DEVICES

[75] Inventor: Edwin L. Cline, Pasadena, Calif.

[73] Assignee: Clayton Manufacturing Company, Los Angeles, Calif.

[22] Filed: Sept. 23, 1970

[21] Appl. No.: 74,885

Related U.S. Application Data
[60] Continuation of Ser. No. 838,997, July 3, 1969, abandoned, which is a division of Ser. No. 559,490, June 22, 1966, Pat. No. 3,453,874.

[52] U.S. Cl. .................................. 73/135, 73/117
[51] Int. Cl. ......................................... G01l 3/16
[58] Field of Search ....... 73/117, 134, 135; 318/304

[56] References Cited
UNITED STATES PATENTS

| | | | |
|---|---|---|---|
| 1,141,802 | 6/1915 | Johnson | 73/135 |
| 2,220,007 | 10/1940 | Winther et al. | 73/134 |
| 2,298,076 | 10/1942 | Whiting | 73/134 |
| 3,277,357 | 10/1966 | Willis | 318/304 |
| 3,364,736 | 1/1968 | Bathurst et al. | 73/134 |
| 3,465,578 | 9/1969 | Douglas | 73/117 |

Primary Examiner—Charles A. Ruehl

[57] ABSTRACT

Apparatus for controlling a rotary power absorber while absorbing driving torque produced by a prime mover. The power absorber includes a housing containing magnetically operated brake elements that are actuatable electrically to provide retarding force. The control means for the brake applying means includes a tachometer generator driven at a speed proportional to the speed of rotation of the prime mover so that electrical current is produced in direct proportion to the speed of the prime mover. A rheostat is connected in the circuit between the generator and the braking elements for controlling the maximum retarding force at various engine speeds. In one form of the invention, a signal amplifier is connected in the circuit between the brake elements and the generator and rheostat. The retarding force is increased and decreased at a rate faster than the changes in speed and torque of the prime mover to avoid stalling of the prime mover as frequently occurs when a constant load is sought to be applied to the prime mover and there is a momentary failure in power of the prime mover.

2 Claims, 4 Drawing Figures

INVENTOR
EDWIN L. CLINE

BY
Bacon & Thomas
ATTORNEYS

APPARATUS FOR CONTROLLING THE CHARACTERISTICS OF MAGNETICALLY OPERATED FRICTION TYPE POWER ABSORPTION DEVICES

CROSS-REFERENCE

This application is a continuation of application Ser. No. 838,997 filed July 3, 1969, now abandoned, which was a division of my application Ser. No. 559,490 filed June 22, 1966, now U.S. Pat. No. 3,453,874, which is hereby incorporated by reference.

BACKGROUND OF THE INVENTION

1. Field of the Invention

This invention relates to equipment for testing the under-load performance characteristics of a prime mover by rotary friction type power absorption devices, and more particularly to novel load control means therefor. For convenience, such device will hereinafter simply be referred to as a friction absorber.

2. Description of the Prior Art

Currently available friction absorbers comprise a rotating brake drum or disk to be connected with the output shaft of the prime mover, and stationary friction pads or brake shoes that are engageable with the drum or disk to apply a retarding force thereto by frictional contact. The degree of retarding action is dictated by the force with which this frictional contact is made. The system that is used to apply this force is referred to as the "Load Control System". In simple friction absorbers this is a "fixed" force and only one speed versus power curve is possible for the reason that a constant retarding force is applied regardless of the speed or torque that is developed by the engine. In more flexible friction absorbers, the load control will allow the operator to manually vary the force of frictional contact. In the case of a hydraulic actuated system, for example, this is accomplished by the operator varying the fluid pressure. A series of speed versus power curves can then be obtained.

Due to the speed versus power characteristics of friction absorbers, the "fixed" force load control system is unsatisfactory because, for a given contact pressure of the brake shoes, the retarding force remains constant (neglecting the effects of temperature) and the same amount of torque will be absorbed throughout the speed range. Friction absorbers that produce a constant retarding force are further objectionable, in that such devices will cause the prime mover to stall in the event that the engine should momentarily miss or lose power for any reason. Such constant force friction absorbers are still further objectionable from the standpoint that they are unstable over the range in which the retarding force is equal to engine torque, which may cover a substantial speed range.

Since horsepower involves both speed and torque, the horsepower will increase and decrease directly with speed. In testing engines with friction absorbers, speed stability can be acquired only when the retarding force of the friction absorber increases and decreases with speed faster than that of the prime mover being tested. An ideal condition would be for the friction retarding force to start at zero with zero speed and change as a square of the speed change. This relationship is very close to the load imposed on a conventional automobile engine when the vehicle is driven on a level road and, hence, represents highly desirable loading characteristics to be simulated in practice. Such operational characteristics obviously cannot be attained with the "fixed" force load control for reasons stated above. Likewise, it is extremely difficult and practically impossible to establish and maintain such operating characteristics in a friction absorber by manual control of the force load, and, hence, such manual control leaves much to be desired.

SUMMARY OF THE INVENTION

Accordingly, there has long existed the need for load control means for friction absorbers that will render the same practical and avoid the principal objections thereto noted above. The load control means of the present invention is designed to obviate these objections and may take any number of forms. Each load control means is made to simulate road conditions, to maintain stability at any speed, and to control the friction absorber means so that the retarding force of the friction absorber means is zero at zero engine speed and will rise and fall faster than the torque of the prime mover being tested. The present load control means contemplates electrical systems that are responsive to engine speed, and which can be adjusted and the load pre-selected to impose a retarding force of a given value at a given speed and automatically and correspondingly control the operating characteristics of the friction absorber in accordance with the foregoing relationship at all other speeds. Each system is also capable of being remotely controlled by an operator.

The present load control means is applicable in principle to all types of friction absorbers, irrespective of whether the friction absorber is directly or indirectly coupled with the output shaft of the prime mover. A direct method would be to connect the prime mover shaft directly to the input shaft of the friction absorber, as in an engine dynamometer test stand setup. An indirect method would involve the incorporation of the friction absorber in a chassis dynamometer for testing engines of automobiles or trucks without removing the engine from the vehicle. In such case, rolls are usually provided to form a type of treadmill for the drive wheels of the vehicle and the friction absorber is then connected with a driven roll. Power from the engine would then be normally transmitted to the friction absorber through the vehicle transmission and differential. For illustrative purposes, and not by way of limitation, the load control means of the present invention is shown and described in connection with a friction absorber associated with a chassis dynamometer.

More specifically, the invention comprises a friction power absorber including a housing containing magnetically operated friction brake elements that are actuatable electrically to provide retarding force. The control means for the brake applying means includes a tachometer generator driven at a speed proportional to the speed of rotation of the prime mover so that electrical current is produced in direct proportion to the speed of the prime mover. A rheostat is connected in the circuit between the generator and the braking elements for controlling the maximum brake retarding force at various engine speeds. In one form of the invention, a signal amplifier is connected in the circuit between the brake elements and the generator and rheostat. The retarding force is increased and decreased at a rate faster than the changes in speed and torque of the prime mover to avoid stalling of the prime mover as frequently occurs when a constant load is sought to be applied to the prime mover and there is a momentary failure in power of the prime mover.

Accordingly, the principal object of the present invention is to provide a load control apparatus for controlling the retarding force characteristics of a friction absorber, so that the retarding force produced thereby increases and decreases in value at a rate faster than the increases and decreases in driving torque applied to said absorber from a prime mover, and so that the applied retarding force value for any given prime mover speed can be preselected at will.

Another object is to provide a dynamometer, including a rotary friction absorber and control means for creating retarding force in opposition to driving torque applied thereto from a prime mover, designed so that the value of the retarding force will be changed in proportion to the occurring changes in driving torque and speed applied to said friction absorber by the prime mover.

A further object is to provide adjustable control means for a friction absorber, constructed so that various value relationships between retarding force and driving torque can be preselected.

Another object is to provide apparatus for controlling the friction characteristics of a friction absorber constructed to automatically vary the retarding force produced by the friction absorber in a preselected manner and as a function of the speed of rotation of the shaft supplying driving torque to said unit.

A more specific object is to provide load control means for a friction absorber, wherein means responsive to the speed of the prime mover being tested is utilized to generate electrical current of a value, proportional to the speed of the prime mover, to correspondingly vary the retarding force created by said friction absorber to provide a preselected load on the prime mover at a given speed.

Another object is to provide load control means for a friction absorber that can be remotely controlled and which allows preselection of the degree of load to be applied to a prime mover.

Other objects and many of the attendant advantages of the invention will become readily apparent from the following description, when taken together with the accompanying drawings.

DESCRIPTION OF PREFERRED EMBODIMENTS

Figure 1:
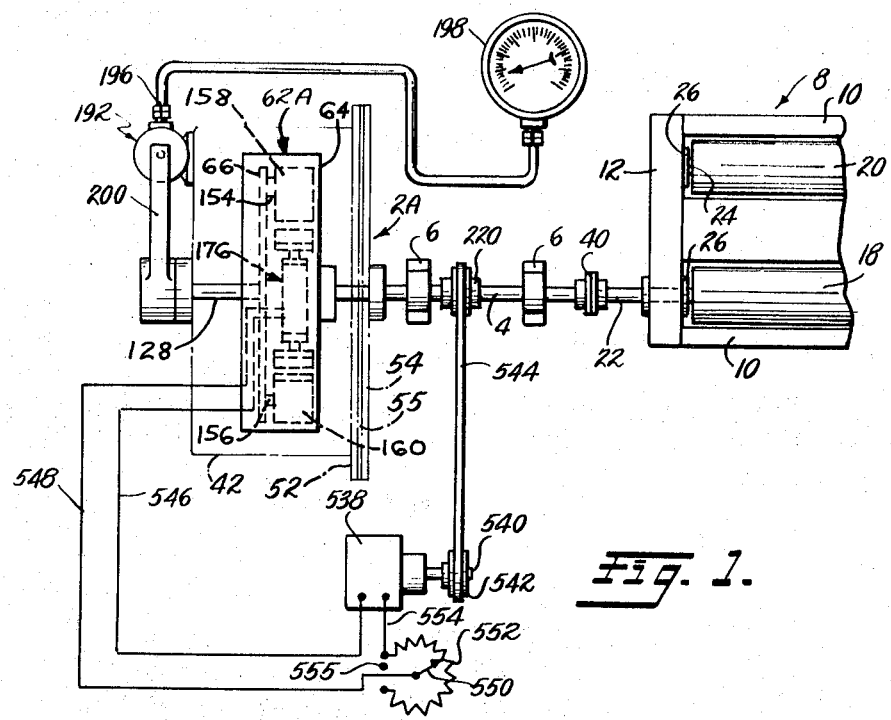
FIG. 1 is a fragmentary, diagrammatic plan view of a chassis dynamometer, including a friction absorber having electromagnetically actuated friction pad elements, and control apparatus for operating said friction absorber in response to the speed of the power input shaft while being driven by the vehicle wheels.

Referring now to FIG. 1, a portion of a conventional chassis dynamometer for testing motor vehicles is shown for use in conducting under-load testing of the engine of the motor vehicle, the dynamometer including absorber assembly 2A to which driving torque is supplied by an input shaft 4 supported by spaced bearings 6. Driving torque is transmitted indirectly from the engine of the motor vehicle undergoing test to the input shaft 4 by a roll assembly 8, upon which the driving wheels (not shown) of the motor vehicle are supported.

The roll assembly 8 has a generally rectangular frame comprised of longitudinal side members 10, interconnected by transverse end members 12, only one of which is shown. The dynamometer includes two pairs of rolls, one of which pairs consists of the parallel rolls 18 and 20 mounted on shafts 22 and 24, respectively, which are supported by bearings 26 mounted on the transverse members 12. The shaft 22 extends beyond the end member 12, and is connected by a coupling 40 with the input shaft 4 of the power absorber assembly 2A. Thus, when the engine of a motor vehicle positioned with one of its drive wheels disposed on the rolls 18 and 20 is operated to rotate said rolls, the wheel will drive the roll 18 to thereby transmit driving torque from the vehicle engine to the input shaft 4 of the power absorber assembly 2A.

The power absorber assembly 2A includes a coolant-receiving casing 42. The front of the casing 42 is open and is surrounded by an external flange 52. A cover plate 54 and a gasket 55 are mounted on the flange 52 to close and seal the casing 42, and are secured to said flange by bolts (not shown).

Mounted within the casing 42 is a friction absorber assembly 62A, which actually is a conventional, electromagnetically operated brake. As is shown in FIG. 1, the absorber 62A may be a conventional electromagnetically operated brake comprising a rotor or drum 64 connected with the shaft 4 and a stator plate 66 within the drum 64 connected with a shaft 128. The stator 66 carries a pair of conventional, arcuate brake shoes 158 and 160 mounted on pins 154 and 156, respectively. The brake shoes 158 and 160 are expanded into engagement with the drum 64 upon energization of an electromagnetically operated actuating unit 176. Or the electromagnetic brake may be of the type shown in Rabinow U.S. Pat. No. 3,575,360 employing a medium of ferrous particles and oil, between the rotor and stator elements, and wherein the braking effect will vary with the value of electrical current applied thereto.

The power assembly 2A comprises a tachometer generator 538 arranged to be driven by the power input shaft 4 and having a shaft 540 with a pulley 542 mounted thereon. The pulley 542 is driven by a belt 544 from the pulley 220. A pair of leads 546 and 548 extends from the actuator 176 of the electromagnetically actuated brake unit 62A, the lead 546 being connected directly to one terminal of the generator 538. The other lead 548 is connected to the sweep arm 550 of a rheostat 552, the input of said rheostat being connected by a lead 554 to the other terminal on the generator 538. The rheostat 552 also includes an "OFF" terminal 555, to which the sweep arm 554 can be moved to interrupt the flow of current to the brake unit 62A, whereby no retarding force will be produced when the power input shaft 4 is rotated.

The dynamometer assembly of FIG. 1 operates in such manner that when the shaft 4 is rotated by driving wheel torque, and the rheostat 552 is switched to an "ON" position, retarding force will be produced by the brake unit 62A. The value of the retarding force will vary directly with the speed of the shaft 4, and thus the retarding force versus speed curve for the dynamometer assembly 8 will correspond to the curve C in FIG. 3, and the power curve for said assembly will correspond to the power curve I in FIG. 4. The retarding force to be produced at any given speed of the shaft 4 is adjusted by the rheostat 552. The greater the resistance inserted into the circuit by the rheostat 552, the smaller will be the current transmitted to the brake unit 62A, and the smaller will be the value of the retarding force at a given speed, and vice versa.

Figure 2:
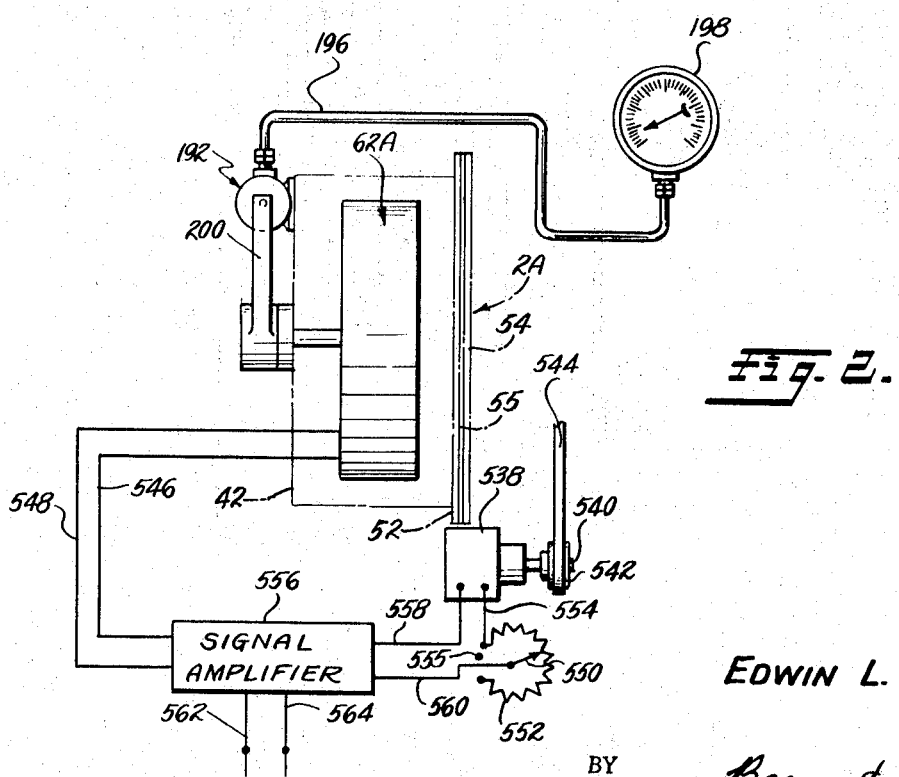
FIG. 2 is a diagrammatic view of an embodiment of the invention wherein the control apparatus includes a signal amplifier for amplifying and controlling the characteristics of the electric signal supplied to the electromagnetic responsive friction absorber.

A modification of the embodiment shown in FIG. 1 is illustrated in FIG. 2, wherein a signal amplifier or signal conditioner 556 is connected between the rheostat 552 and the electromagnetic brake unit 62A. The leads 548 and 546 from the friction absorber 62A are connected to the output terminals of the signal amplifier 556, and a lead 558 connects one terminal of the generator 538 to one input terminal of the amplifier 556. A lead 560 connects the sweep arm 550 to the other input terminal of the amplifier 556. The signal amplifier 556 is supplied with current through leads 562 and 564 from a suitable power source.

Electromagnetic responsive brake apparatus of the type employed in the friction absorber 62A can typically be operated by a very small current, such as is generated by the tachometer generator 538. In some instances, however, it is desirable to amplify the output of the generator 538, and the signal amplifier 556 in FIG. 2 serves this purpose. The arrangement of FIG. 2 also makes possible control over the signal transmitted to the brake unit 62A.

It is known that power signal amplifiers, such as that indicated at 556, can be constructed so that the amplified output signal thereof can be any preselected function of the input signal supplied thereto. Thus, by properly setting the amplifier 556, the electrical signal supplied through the leads 546 and 548 can vary directly, as the square, or as some other mathematical power of the changes in speed of the shaft 4, even though the signal supplied from the generator 538 varies only directly with the speed of the input shaft 4. The arrangement of FIG. 2 thus makes possible great flexibility in retarding force and absorbed power obtainable from the friction absorber 62A.

Figure 3:
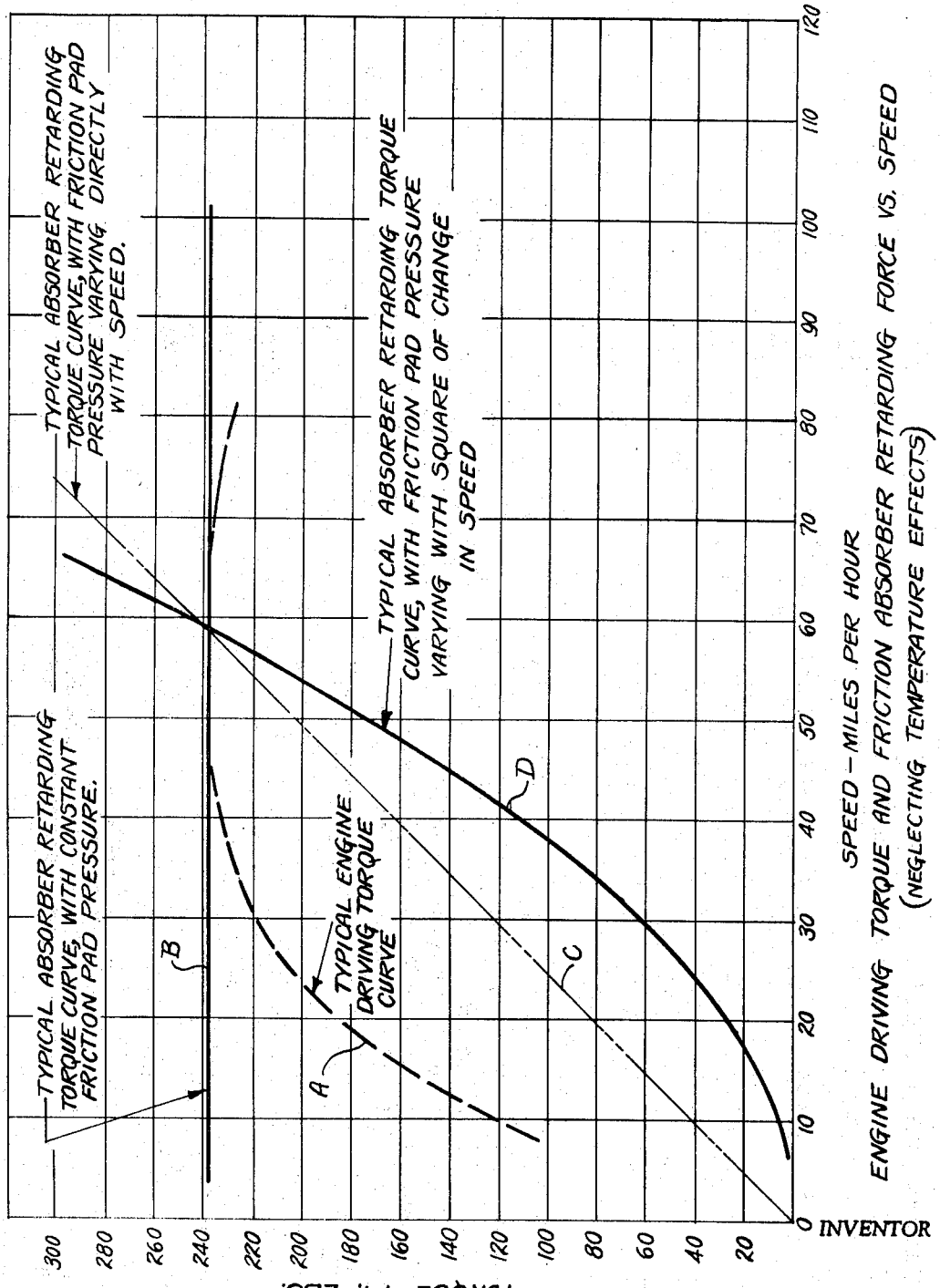
FIG. 3 is a graph comparing engine driving torque in foot pounds and friction absorber retarding force, with vehicle speed in miles per hour and showing in particular by the curves retarding force produced by controlling differently the pressure applied to the friction elements.

Referring now to the graph of FIG. 3, the driving torque-speed characteristics for a typical motor vehicle engine is indicated by the curve A. Here, the values of torque in foot pounds are plotted as ordinates, and the corresponding vehicle speeds in miles per hour are plotted as abscissas. It is seen that the engine driving torque rises rapidly with increasing engine speed, from zero to about 25 miles per hour, and that thereafter driving torque increases at a slower rate with engine speed, until at about 47 miles per hour the driving torque becomes stabilized. Over the range from about 47 miles per hour to about 65 miles per hour, no appreciable increase in driving torque occurs. Above about 65 miles per hour, the value of engine driving torque decreases with increasing engine speed.

One manner of operating the friction absorber 62A would be to omit the tachometer generator 538 and supply a constant current value thereto, the result of which would be as illustrated by the curve B in FIG. 3, wherein it is seen that the value of the retarding force would then be constant over the complete range of engine speed, from zero miles per hour upwardly. However, while under-load testing a motor vehicle engine, or other prime mover, it is desirable to operate the engine at several different stable operating speeds, instead of under constant load at different speeds. When using friction dynamometer equipment, a stable speed is obtained by matching the value of the generated retarding force to the value of the driving torque, until operation of the prime mover at the desired preselected speeds results. Turning to the curves A and B in FIG. 3, it is seen that between about 47 and about 65 miles per hour the engine driving torque curve A is parallel with the constant value retarding force curve B. Because of this parallel relationship, it is practically impossible over this common driving speed range to match retarding force to the driving torque and effect stability. The result is a "hunting" action, or a "running wild" of the engine, and hence true performance testing of the engine is not possible.

Another problem, with a constant retarding force, results from the fact that in the lower speed ranges, driving torque decreases rapidly in value with decreased speed, as is shown by the curve A, FIG. 3. Thus, assuming that under-load testing is in progress at a substantially stable engine speed of 30 miles per hour, a problem arises if the engine should misfire or momentarily lose power. While there would then be an immediate decrease in driving torque, the retarding force would remain constant, and as the driving torque began to decrease, the constant retarding force would act to further slow the engine, and rapid decrease in driving torque would occur until the engine completely stalled. This condition can be alleviated by having the retarding force increase and decrease with changes in speed, and hence with driving torque.

It has been found that for the most efficient engine operation, the value of the retarding force should preferably be substantially zero at zero engine speed, and should rise and fall faster than the changes in the driving torque output of the prime mover being tested. When the value of the retarding force is thus varied, the power absorbed, versus engine speed, will increase and decrease more rapidly than engine power output. Referring again to FIG. 3, curve C represents a situation where retarding force is varied directly with changes in engine speed, which can be done by driving the tachometer 538 from the roll 18 so that the current generated will be in direct proportion to changes in the speed of the engine being tested. Thus, at zero speed the retarding force is also zero. As the engine speed increases, there is a corresponding increase in driving torque, and similarly, when engine speed decreases the retarding force changes accordingly. It is seen that the retarding force curve C cuts sharply across the typical driving torque curve A, at about 58 miles per hour, and that there are no regions where the retarding force curve C is parallel with the engine driving torque curve A. Thus, retarding force can easily be matched with driving torque to provide a stable operating speed, and there is no problem of engine stall occurring when there is a temporary decline in driving torque, because the retarding force follows such decline.

In the case of automotive engines, it has been found that the best relationship for retarding force is to have the value thereof increase and decrease as approximately the square of the change in speed, and to be zero at zero speed. The reason this is a nearly ideal condition is that it very closely simulates the load actually imposed on a conventional automobile engine while the vehicle is being driven on a level road. Such a retarding force versus speed curve is shown at D in FIG. 3. Such retarding force can be created by adjusting the signal amplifier 556 so as to vary the value of the current supplied to the brake unit 62A in accordance with the square of the changes in engine speed.

The load control apparatus of the present invention will vary, with speed, the electromotive force available to actuate the brake unit 62A, and therefore is effective to vary the value of retarding force produced in proportion to the driving torque. The load control apparatus is designed so that the retarding force versus speed curve of the friction absorber 62A can be shifted to the right or left around zero in FIG. 3 to obtain nearly any desired value of retarding force at any given speed, whereby nearly any stable operating speed can be established for under-load testing of a prime mover.

It is also seen that the curve D in FIG. 3 can be shifted to the right or left by varying the ratio between the speed of rotation of the tachometer generator shaft 540 and the input shaft 4. Such ratio changes can be effected by any suitable means, for example, by transmitting the drive through a variable speed drive mechanism, using different sizes of pulleys, etc.

Figure 4:
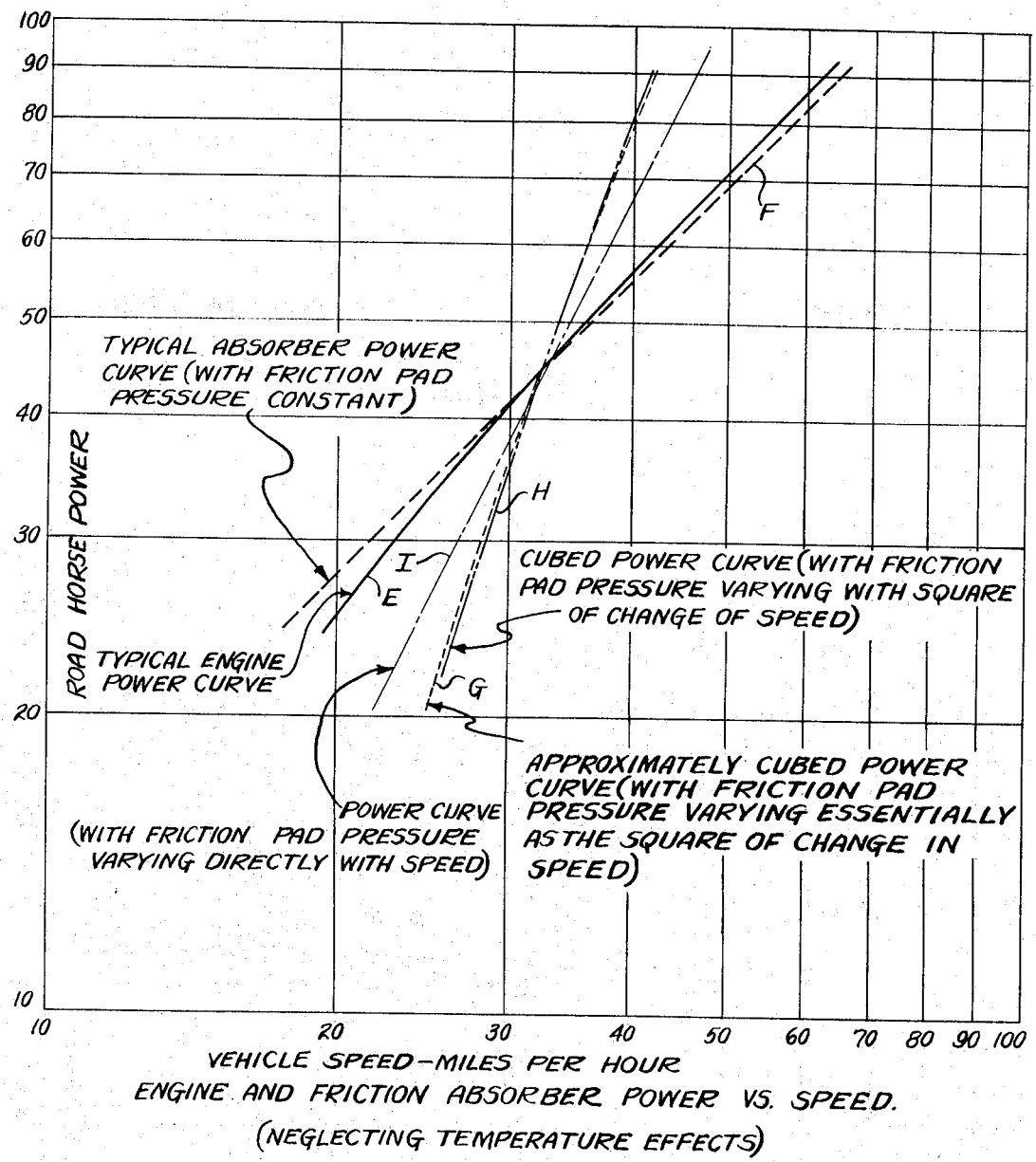
FIG. 4 is a graph comparing road horsepower absorbed by the friction absorber with vehicle speed in miles per hour, and showing typical power curves for the friction absorber resulting from using the load control systems of the present invention.

FIG. 4 is a graph wherein road horsepower is plotted against vehicle speed in miles per hour, the curve E showing a typical power curve for an automobile engine. A typical power curve for a friction absorber wherein the retarding force is constant is shown at F, and it is seen that the slope of the curve F is substantially less than that of the curve E, whereby the power absorbed by the friction absorber 62A rises and falls at a slower rate with speed than does engine power. On the other hand, the curve G plots the power absorbed by the friction absorber 62A against engine speed in terms of vehicle speed in miles per hour, and it is seen that in this instance the absorbed power curve has a slope substantially greater than the engine power curve E, whereby the absorbed power rises and falls at a rate faster than the increases and decreases in engine power. The arrangements of FIG. 1 and 2 thus make it possible to easily attain any desired stable operating speed for a prime mover during underload testing, and because retarding force and absorbed power rise and fall at faster rates than driving torque and engine power, rapid response of the friction absorber 62A to changes in vehicle speed is assured and the problem of stalling in instances where the prime mover momentarily loses power is eliminated.

Obviously, many additional modifications and variations of the present invention are possible in the light of the above teachings.

I claim:

1. A friction type power absorber for use in analyzing the performance of a prime mover, comprising: a brake shaft for receiving driving torque from a member driven by a prime mover; power absorption means including rotor means connected with said brake shaft to receive driving torque from said brake shaft, stator means operatively disposed relative to said rotor means; friction brake means carried by one of either said rotor or stator means and movable into and out of frictional engagement with the other; electric actuator means operable to apply force for moving said friction brake means into said frictional engagement to thereby apply retarding force to said rotor in opposition to driving torque applied thereto by said brake shaft, the value of said retarding force varying with the force exerted by said actuator means; and control means including means to generate an electric signal to actuate an element of an electrical system for controlling said electric actuator means in accordance with the speed of rotation of said brake shaft so that the force exerted on said friction brake means by said actuator means varies as a function of said rotational speed and so that said retarding force is substantially zero at zero speed of said brake shaft and increases and decreases in value at a rate faster than said driving torque.

2. A friction type power absorber for use in analyzing the performance of a prime mover, comprising: a brake shaft for receiving driving torque from a member driven by a prime mover; power absorption means including drum-like rotor means connected with said brake shaft to receive driving torque from said brake shaft, stator means operatively disposed within said rotor means; electromagnetically operated rotation retarding brake means positioned between said rotor and stator means; electrical actuator means operable to energize said brake means to thereby apply retarding force to said rotor in opposition to driving torque applied thereto by said brake shaft, the value of said retarding force varying with current supplied through said actuator means; and control means including means to generate an electrical signal to actuate an element of an electrical system for controlling said electrical actuator means in accordance with the speed of rotation of said brake shaft so that the energizing force exerted on said brake means by said actuator means varies as a function of said rotational speed and so that said retarding force is substantially zero at zero speed of said brake shaft and increases and decreases in value at a rate faster than said driving torque.

* * * * *